X-RAY DIFFRACTION PATTERNS AT 25 °C OF VULCANIZED CIS-1,4 POLYBUTADIENE OF EXAMPLE 8
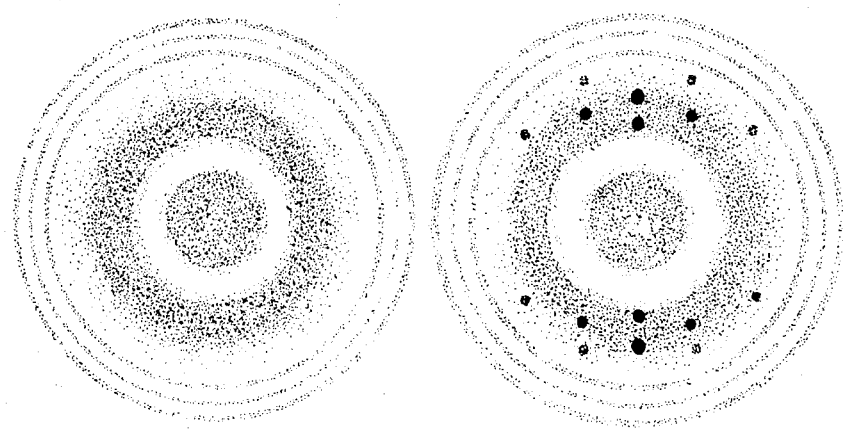
UNSTRETCHED SAMPLE   STRETCHED SAMPLE

United States Patent Office 3,281,404
Patented Oct. 25, 1966

3,281,404
CRYSTALLINE 1,4-CIS POLYBUTADIENE AND
PROCESSES FOR PRODUCTION THEREOF
Giulio Natta, Lido Porri, and Paolo Corradini, Milan,
Italy, assignors to Montecatini Societa Generale per
l'Industria Mineraria e Chimica, Milan, Italy
Filed July 22, 1957, Ser. No. 673,514
Claims priority, application Italy, July 31, 1956,
11,534/56
8 Claims. (Cl. 260—94.7)

This invention relates to polymers of diolefines and to processes for producing them. More particularly, the invention is concerned with crystalline butadiene polymers having a prevailingly 1,4-cis configuration, and to processes for producing said crystalline polymers.

The polymerization of diolefines to linear, high polymers with the aid of catalysts obtained by reacting derivatives of transition metals of the 4th to 6th groups of the Mendeleeff Periodic Table with organometallic compounds of the 1st to 3rd groups of said Periodic Table has been described by G. Natta et al. It has also been disclosed by G. Natta et al. that, by selection of the catalyst of the type aforesaid, the polymerization of butadiene and other diolefines can be oriented to the production of polymers having, prevailingly 1,4-enchainment or to polymers having, prevailingly, 1,2-enchainment of the monomeric units.

In the case of the polymeric diolefines having isotactic 1,2-configuration, syndiotactic 1,2-configuration, or 1,4-trans-configuration, it was possible to obtain, by the methods described, products of such purity as to exhibit crystallinity at room temperature. However, butadiene polymers having 1,4-cis configuration could not be separated from the crude polymerizate in a condition of such purity that crystallinity could be detected under the X-rays at room temperature.

The impure polymers having the 1,4-cis configuration which were obtained were not useful in the preparation of good elastomers, due to their failure to crystallize at room temperature, even under stretching.

A process for the production of linear polymers of butadiene in which at least 90% of the monomeric units have 1,4-enchainment, by polymerization in the presence of a catalyst prepared from triethyl aluminum and titanium trichloride, has also been disclosed by G. Natta et al. In that case, the crude polymer obtained can be extracted with warm diethyl ether to separate a fraction which is amorphous at room temperature and contains monomeric units with both 1,2 and 1,4 enchainment, both the cis and trans configuration being present, and the units with 1,4-cis configuration being greater in number than each of the other two types, leaving a residue of the ether extraction which is crystalline at room temperature, insoluble in the diethyl ether but partially soluble in such solvents as n-heptane, benzene and toluene and which, when subjected to infra-red examination, appears to consist almost entirely of units having 1,4-trans configuration.

However, if the crude polymerizate is first extracted with acetone and then with methylethyl ketone before it is extracted with diethyl ether, then in the fraction which is extracted with ether from the residue of the methylethyl ketone extraction more than 50% of the monomeric units have 1,4-cis configuration. This fraction which is soluble in ether and insoluble in methylethyl ketone is also amorphous at room temperature but when it is examined under the X-rays at low temperature, e.g., at about $-30°$ C. or below, it is found to be at least partially crystalline and shows a spectrum which is clearly different from that of 1,4-trans polybutadiene. The partial crystallinity at low temperature can be attributed to either of two conditions, (a) a portion of the macromolecules consists exclusively of units with 1,4-cis configuration or (b) the macromolecules consist of chain portions formed by 1,4-cis units interspersed with chain portions consisting of units of a different type.

We have now produced a new type of butadiene polymer which, when subjected to infra-red examination, is found to have a prevailingly 1,4-cis configuration and which is crystalline at the X-rays not only at low temperature but also at room temperature, under stretching.

Isoprene polymers having a prevailingly 1,4-cis configuration similar to that of natural rubber but capable of crystallizing only when stretched 600% have been described in Belgian Patent No. 543,292. Butadiene polymers with about 90% of the monomeric units having a 1,4-cis configuration have also been described. However, a butadiene polymer which both has a 1,4-cis configuration and is crystalline at room temperature under stretching has never been reported heretofore.

As is well known, when crystalline substances are examined at the X-rays, the observed patterns abound in sharp diffractions only when the single crystals have a size larger than 100–200 A. The presence of smaller crystals having sizes between 50 and 100 A. can be deduced from the presence of diffractions which are not sharp, but blurred.

The X-ray diffraction patterns of our new 1,4-cis polybutadiene are characterized by the presence of sharp diffractions. It appears that the single crystals of the new polybutadiene have a size of some hundreds A., and that, therefore, the polymers we have produced and examined contain chain portions consisting only of 1,4-cis units which have a length of that order, i.e. some hundreds of A.

The process for producing our new polybutadiene comprises polymerizing butadiene with the aid of a selected catalyst prepared from a metallorganic compound of a metal of the 1st, 2nd or 3rd group of the Periodic Table and a transition metal compound, preferably in a selected molar ratio, extracting the crude polymerizate successively with hot acetone, methylethyl ketone and ether to obtain an ether extract in which more than 50% of the units have 1,4-cis configuration.

If the ether extracted fraction is dissolved again in ether of room temperature and then cooled to a temperature of about $-30°$ C. to $-70°$ C. and this operation is repeated again on the precipitate thus obtained, or if the ether extracted fraction is purified by further extraction with propane, butane, etc., at low temperature, the final product is richer in 1,4-cis units than the starting fraction and is at least partially crystalline at room temperature under stretching when examined at the X-rays.

As regards the attitude to crystallize of the polymers of this type, which attitude is of fundamental importance in connection with their suitability to the preparation of elastomers, one must observe that it depends not so much on the content of 1,4-cis units, which can be desumed from the infra-red spectra, as on the type of monomeric units of different configuration which are present and on the way these units are distributed in the macromolecules.

If, for example, the extraneous monomeric units are homogeneously distributed along the chains, so that there are only very short sections consisting only of 1,4-cis units, the tendency to crystallize is scarce or absent. If, on the contrary, because of the irregular distribution of the extraneous units, long sections of 1,4-cis units are present, the tendency to crystallize is much higher.

As regards the influence exerted by the type of extraneous units present on the attitude to crystallization, it can be said that the presence of 1,2- units is much more detrimental than the presence of 1,4-trans units. This is because the side vinyl groups hinder the orientation of the macromolecules, which is a prerequisite of crystallization. It is thus possible that a polymer containing a very high percentage of 1,4-cis units (e.g. up to 90%) together wih prevailingly 1,2 units has a much lower tendency to crystallize than a polymer containing a lower percentage (70–80%) of 1,4-cis units prevailingly accompanied by 1,4-trans units.

The X-ray patterns which are characteristic of the new polybutadiene show diffractions corresponding to lattice distances of 4.75 A. and 3.98 A.

The crystallinity is dependent on the degree of stretching of the samples, the highly stretched samples showing a very high orientation.

The fiber diagrams show about 50 clearly detectable diffractions. In the stretched samples, the small crystals are oriented with the chain axis parallel to the stretching direction.

The diffractions in the X-ray patterns are attributable to an elementary cell corresponding to a monocline structure having the following constants:

$a = 4.6$ A.        $c = 8.6$ A.
$b = 9.5$ A.        $\beta = 109°$

Each elementary cell contains two portions of chain, each including two monomeric units. Taking the missing diffractions and the intensity of those observed into account, it can be concluded that the crystals belong to the space group $C^6_{2h}$.

The position of the atoms corresponds to the following coordinates:

|  | $x$ | $y$ | $z$ |
| --- | --- | --- | --- |
| $C_1(CH_2)$ | 0.094 | 0 | 0.094 |
| $C_2(CH)$ | 0.041 | 0.133 | 0.184 |

In the earlier work, it was found that the ratio of the fraction soluble in hot ether, to the residue consisting almost completely of units having 1,4-trans configuration, varied depending on the transition metal compound used in preparing the catalyst. When the catalyst was prepared from an alkyl compound of the metal of the 1st to 3rd columns of the Periodic Table and a low valency crystalline compound of the transition metal, and especially such a titanium compound, polymers having a prevailingly 1,4-trans configuration were obtained at widely varying molar ratios of the metallorganic compound to the transition metal compound.

We have now found that a polymerizate containing a higher proportion of polymers having the 1,4-cis configuration is obtained if the catalyst used is prepared from the organometallic compound and a transition metal compound of the 4th group of the Periodic Table in which the metal has the maximum valency corresponding to its position in the periodic Table, e.g. $TiCl_4$, $TiCl_3OR$, etc.

The proportion of polymer having the 1,4-cis configuration in the polymerization product can, within certain limits, be regulated by regulating the ratio between organometallic compound and transition metal compound in the preparation of the catalyst. Under certain conditions the polymerization product may be almost entirely soluble in ether, and the 1,4-trans polymer, crystallizable at room temperature, may then be completely absent.

Best results as regards the proportion of 1,4-cis polybutadiene in the polymerization product are obtained when the catalyst is prepared using a trialkyl aluminum compound and a metal compound of the 4th group of the Periodic Table in a molar ratio of from 1:1 to 1.5:1.

The crude polymerization product obtained when operating within this range of molar ratios consists of a polymer which is amorphous at room temperature, and which at —30° C. or below shows a crystallinity due to 1,4-cis configuration of the monomeric units, the percentage of 1,4-cis units being 60 to 65%. The crude polymer dissolves in boiling ether to the extent of at least 80%.

If the alkyl metallic compound and the metal compound of the 4th group are used in a molar ratio higher than 1.5:1, the crude polymerization product contains between 45 and 50% of a polymer soluble in boiling ether, having 60 to 65% of 1,4-cis units, while the ether insoluble residue shows a crystallinity due to 1,4-trans configuration of the monomeric units.

It was observed that, in order to obtain constant results, dilute solutions (approximately 5% by weight) of the trialkyl aluminum and of the metal compound of the 4th group in hydrocarbon solvents should be used.

The order of mixing of the two catalyst components is of importance in determining the characteristics of the polymer obtained. In order to obtain a polymer as described it is preferable to gradually mix the two components, adding the trialkyl aluminum solution slowly to the stirred 4th group metal compound solution.

The preparation of the catalyst may be carried out in the polymerization vessel or the catalyst may be prepared separately and the suspension obtained then introduced into the polymerization vessel, whereupon liquid butadiene is added.

The preferred embodiment of the present invention therefore comprises polymerizing butadiene with a catalyst prepared by gradually adding a hydrocarbon solution of a trialkyl aluminum compound in which the alkyl radical contains from 1 to 6 carbon atoms to the solution of a high valency halide or halo-alkoxide of titanium in an aluminum/titanium molar ratio of 1 to 1.5.

Various solvent fractionation procedures for separating the 1,4-cis polybutadiene fraction crystalline under stretch at room temperature, are possible. In one preferred procedure the said fraction is separated by extracting the polymerization product with acetone, methyl ethyl ketone, and ethyl ether in turn, the ethyl ether extract being subjected to repeated operations of dissolution in diethyl ether at room temperature and reprecipitation by cooling to a temperature of from about —70° C. to —30° C. In another procedure the said fraction is separated by extracting the polymerization product with acetone, methyl ethyl ketone and diethyl ether in turn, and solvent extracting the material extracted by the ethyl ether at a temperature below 0° C. (e.g. with propane, butane or pentane at from —50° to —30° C.) thereby leaving said fraction as a residue.

The new polymers having the 1,4-cis configuration can be vulcanized with sulfur by the usual methods, using conventional vulcanization accelerators. Elastic rubbers which are amorphous at room temperature in the unstretched state and crystalline at room temperature under stretching can thus be obtained. The products vulcanized with small amounts of sulfur are good elastic rubbers showing a high impact resilience and giving a stress-elongation diagram which is characterized by a relatively low initial elastic modulus and by a higher elastic modulus at higher elongations. These properties, in addition to the crystallinity detectable under the X-rays, are characteristic for polymers having a high content of units with 1,4-cis configuration and containing long portions of chain having exclusively the 1,4-cis configuration.

The following examples are given to illustrate the invention and are not intended as limiting.

Example 1

In a 250 ml. flask, fitted with a leak-proof stirrer, and which was previously evacuated and filled with nitrogen, are introduced 0.75 ml. $TiCl_4$ in 75 ml. cyclohexane; 1, 12 ml. triethyl aluminum dissolved in 50 ml. cyclohexane are then added in 30–40 minutes from a dropping funnel.

The suspension thus obtained is siphoned in a 250 ml. shaking autoclave previously evacuated, and immediately thereafter 60 g. butadiene are added from a small cylinder. The autoclave is kept in motion at the temperature of 15° C. for about 2 hours; the reaction is then stopped by addition of 30 ml. methanol. The reaction product is extracted from the autoclave, coagulated with methanol acidified with hydrochloric acid, repeatedly washed with methanol and dried under vacuum.

30 g. polymer are obtained, which are completely amorphous when examined at the X-rays at room temperature, and show a 1,4-cis crystallinity when examined at a temperature of −30° C. or below.

By solvent extraction the following results are obtained:

|  | Percent |
|---|---|
| Aceton extractable fraction | 0 |
| Methyl ethyl ketone extractable fraction | 4 |
| Diethyl ether extractable fraction | 80–85 |

By infra-red examination the polymer is shown to have approximately 60% of the monomeric units with 1,4-cis configuration 1 to 2% with 1,2-enchainment, and 38 to 39% with 1,4-trans configuration.

The infra-red analysis of the poly-butadiene samples in this and in the following examples was carried out as follows:

The partially soluble samples were suspended in carbon disulfide; after 1 to 2 hours standing the carbon disulfide was partially evaporated so as to leave a gelatinous or viscous residue.

The completely soluble samples were dissolved in carbon disulfide and the solution concentrated to give a gelatinous or viscous residue as for the insoluble samples. This residue was examined by infra-red spectrometry, enclosing it between two conveniently spaced sodium chloride plates.

To determine the percentage of the various monomeric unit configurations present in the polymer, the following bands were selected and the following coefficients used:

|  | Bands | | |
|---|---|---|---|
|  | 10.35μ | 11μ | 13.60μ |
| 1,4 Trans | $10 \times 10^4 \epsilon$ | $0.12 \times 10^4 \epsilon$ | 0 |
| 1,2 | $0.42 \times 10^4$ | $12 \times 10^4$ | 0 |
| 1,4 Cis | 0 | 0 | $6 \times 10^4 \epsilon$ |

$$\epsilon = \frac{E}{\frac{mols.}{cm^3} cm.}; \quad E = \text{extinction}$$

In accordance with W. S. Richardson (Journal Polymer Science XIII, 229 (1954)) we have neglected the weak absorption bands presented by 1,4-cis rich butadiene polymers in the 10–11 micron region.

According to our experience no absorption is noted either for 1,4-trans or 1,2-polymers, on samples having a thickness of a few hundredths of a millimeter as are used for analytical purposes, at 13.6 microns, which is the characteristic wave length for the 1,4-cis configuration.

Example 2

A solution of 0.5 ml. $TiCl_4$ in 50 ml. pure anhydrous pentane is introduced into a 250 ml. flask fitted with a leak-proof stirrer and filled with nitorgen.

1.5 ml. triisobutyl aluminum dissolved in 50 ml. pure anhydrous pentane are then added into the flask from a dropping funnel in about 45 minutes, while stirring. A dark brown precipitate is formed and the suspension is siphoned into an evacuated shaking autoclave of 250 ml. capacity, into which 40 g. 99% butadiene are then added from a small cylinder.

After keeping the autoclave in motion for about 40 minutes at 15° C., the reaction is stopped by adding 30 ml. of methanol. The reaction product is taken out and treated with methanol acidified with hydrochloric acid, thoroughly washed with methanol and finally dried under vacuum.

37 g. of solid polymer are obtained which, when examined by infra-red analysis, show that 62% of the monomeric units have a 1,4-cis configuration, 2% a 1,2-enchainment and 36% a 1,4-trans configuration.

When examined by X-rays at 20° C. the product appears amorphous, but when examined at −30° C. or below, the 1,4-cis crystallinity appears.

68% of the polymer is soluble in warm diethyl ether.

Example 3

0.5 ml. $TiCl_4$ dissolved in 75 ml. petroleum ether are introduced into a 250 ml. flask fitted with a leak-proof stirrer and filled with nitrogen.

A solution of 0.75 ml. triethyl aluminum in 50 ml. petroleum ether is then added from a dropping funnel in about 30 minutes while stirring.

The suspension is introduced into a 500 ml. shaking autoclave and immediately thereafter 80 g. of butadiene are added.

The autoclave is set in motion while the inside temperature is kept at 15 to 25° C. by circulating a cooling liquid in the jacket.

After 45 minutes the reaction is stopped by adding methanol, and the polymer is treated with methanol acidified with hydrochloric acid, washed thoroughly with methanol and finally dried under vacuum.

35 g. of polymer are obtained which, by infra-red examination, show a 59% content of monomeric units with 1,4-cis configuration and 2 to 3% of monomeric units with 1,2-enchainment.

The polymer is amorphous by X-rays examination at room temperature. 75% of it dissolves in warm ether. The ether soluble polymer has an intrinsic viscosity, in toluene at 30° C., of 2.5.

Example 4

0.75 ml. titanium tetrachloride (0.0068 mol) dissolved in 75 ml. pure n-heptane are introduced into a 250 ml. flask fitted with a leak-proof stirrer and filled with nitrogen.

8.5 ml. of 0.83 molar heptane solution of trihexyl aluminum (approximately 0.0068 mol) are added from a dropping funnel in about 50 minutes while stirring.

A brown suspension is formed, which settles only with difficulty, and is transferred into a previously evacuated 500 ml. shaking autoclave.

70 g. of 99% butadiene are added and the temperature is maintained at 20° C. while keeping the autoclave in motion.

After approximately one hour, the reaction is stopped by addition of 30 ml. of methanol. The reaction product is treated with methanol acidified with hydrochloric acid, washed thoroughly with methanol and finally dried under vacuum.

38 g. of polymer are obtained which appear completely amorphous at room temperature, but when examined by X-rays at −50° C. clearly show crystallinity due to a 1,4-cis configuration.

The infra-red examination shows that 59% of the monomeric units having a 1,4-cis configuration while 3 to 5% have a 1,2 enchainment.

76% of the polymer is soluble in ether.

*Example 5*

0.58 ml. TiCl₄ dissolved in 75 ml. pure heptane are introduced into a 250 ml. flask, fitted with a leak-proof stirrer and filled with nitrogen.

1.5 ml. triethyl aluminum dissolved in 50 ml. pure heptane are added in about 30 minutes from a dropping funnel, while stirring.

During the addition of triethyl aluminum a precipitate forms in the flask, which is brown at first and gets then black.

Once the addition is finished the suspension is left standing, the black precipitate settles and the supernatant liquid (approximately 50 ml.) is siphoned out: 50 ml. of fresh heptane are added to the residue the mass is stirred and the precipitate is left to settle, then another 50 ml. of liquid are siphoned out.

The precipitate is washed once more in the same way and the residual suspension (approximately 100 ml.) is siphoned into a 250 ml. shaking autoclave, which has been previously evacuated.

After adding 50 g. butadiene, the autoclave is kept in motion for 5 hours, while the temperature is kept at 15° C. by circulation of a cooling liquid through the jacket.

The reaction is stopped by addition of 30 ml. of methanol. 25 g. of solid polymer are obtained which by infrared analysis are shown to have the following composition:

| | Percent |
|---|---|
| Trans-1,4 configuration | 57 |
| Cis-1,4 configuration | 38 |
| 1,2-enchainment | 5 |

By X-rays examination at room temperature crystallinity due to 1,4-trans configuration is detected.

3.5% of the polymer is extractable with acetone, 4% with methyl ethyl ketone and 42% with ether.

The infra-red analysis of the ether extract shows that 32% of it has 1,4-trans configuration, 62% 1,4-cis configuration and 6% 1,2-enchainment.

The suspension obtained by adding the triethyl aluminum to the TiCl₄ solution may be added as such, without subjecting it to washing as described. In this case the polymerization product contains a higher percentage of low molecular weight polymers.

*Example 6*

0.60 ml. of TiCl₄ dissolved in 75 ml. of pure n-heptane are introduced in a 250 ml. flask fitted with leak-proof stirrer and filled with nitrogen.

A solution of 2 ml. triethyl aluminum in 50 ml. pure heptane is added in 30 minutes under stirring. A black precipitate is formed which settles easily; 50 ml. of the supernatant liquid are siphoned out, 50 ml. fresh heptane are added and the mass is stirred and then left to settle.

The precipitate is washed once more by decantation and is then introduced into an evacuated 250 ml. autoclave. 50 g. butadiene are added and the autoclave is kept in motion for 5 hours at 15° C.

The reaction is then stopped by adding 30 ml. of methanol, and 21 g. of polymer are obtained.

The X-ray examination reveals the presence of 1,4-trans crystallinity, while the infra-red spectrum show that in the polymer 72% of the monomeric units have 1,4-trans configuration, 21% 1,4-cis configurations, 7% 1,2-enchainment.

The ether extract obtained after extraction of the polymer with boiling acetone and methyl ethyl ketone has, according to the infra-red spectrum the following composition:

| | Percent |
|---|---|
| 1,4-trans | 30 |
| 1,4-cis | 61 |
| 1,2 | 9 |

The intrinsic viscosity of this extract, in toluene at 30° C., is 2.89.

*Example 7*

The solution of 1 ml. TiCl₄ in 50 ml. heptane is introduced into a shaking autoclave of 500 ml. capacity, which has previously been evacuated, and 2 ml. diethyl zinc in 50 ml. heptane are then added.

After shaking for a few minutes, 100 g. of butadiene are introduced. The autoclave is kept in motion for 7 hours at 20° C., whereupon the reaction is stopped by introduction of 30 ml. of methanol.

40 g. of a solid polymer are obtained, which are fractionated by successive extraction with boiling acetone, methyl ethyl ketone and ether.

The ether extract (20% of the total) is amorphous at the X-rays at room temperature, whereas at the temperature of −30° C., or below, 1,4-cis crystallinity appears.

The infra-red spectrum shows that it has the following composition:

| | Percent |
|---|---|
| 1,4-trans | 27 |
| 1,4-cis | 68 |
| 1,2 | 5 |

*Example 8*

The ether soluble and acetone and methyl ethyl ketone insoluble fraction obtained according to one of the foregoing example, and having a 1,4-cis content of about 60%, is dissolved in diethyl ether to obtain an approximately 0.5% solution.

The solution is slowly cooled under stirring to −50° C. The precipitate is separated from the solution, while keeping the temperature at −50° C., and dissolved again in either at room temperature. The new solution having a concentration of about 0.2 to 0.5% is slowly cooled to −40° C. and the precipitate is separated by decantation from the supernatant solution. This crystallizing operation at low temperature is repeated again 3–4 times, and a polymer having a 1,4-cis content of 80 to 85% is obtained at the end.

This polymer is vulcanized using the following recipe:

| | Grams |
|---|---|
| Polymer | 100 |
| Sulphur | 1 |
| MBTS[1] | 0.5 |
| Zinc oxide | 3 |
| Stearic acid | 1 |
| 2,2′-methylene-bis(4-methyl-6 tert-butylphenol) | 1 |

Curing is done at 160° C. for 20 minutes.

[1] Di-2-benzothiazyl disulphide.

A rubber-like product is obtained which, when examined at the X-rays at 25° C. in a state of relaxation appears completely amorphous, while it appear crystalline in the stretched state, at the same temperature.

The differences in the X-ray patterns are illustrated in the attached figure.

*Example 9*

The ether extract obtained according to Example 6 is dissolved in ether at room temperature, to obtain an approximately 0.2% by weight solution.

The solution is slowly cooled to −70° C., whereby a white precipitate is formed, which is separated by siphoning the clear solution.

The precipitate is dissolved again in ether at room temperature and the new solution, having a concentration of 0.2 to 0.3%, is again cooled to −70° C.

The fraction which thus precipitates, when examined at the infra-red, shows the following composition:

| | Percent |
|---|---|
| 1,4-trans | 19 |
| 1,4-cis | 75 |
| 1,2 | 6 |

After 2 additional crystallizations from ether, the product obtained shows, when examined at the infra-red, the following composition:

| | Percent |
|---|---|
| 1,4-trans | 14 |
| 1,4-cis | 83 |
| 1,2 | 3 |

The product obtained from the last crystallization, when vulcanized following the recipe given in Example 8, yields a rubber-like product which, when stretched, shows crystallinity at room temperature.

*Example 10*

An ether extracted fraction obtained as in one of the foregoing examples and having about 60% of monomeric units with a 1,4-cis configuration, is extracted with butane or pentane at −50° C., for about 100 hours. The extraction residue is found on X-ray examination to have a 1,4-cis configuration and to be crystalline at room temperature, under stretching.

What is claimed is:

1. A process for producing polybutadiene which has substantially 1,4-cis configuration, is sulfur-vulcanizable and, after vulcanization, is crystallizable at room temperature under stretching, which process comprises contacting butadiene, under polymerization conditions and at a temperature of from about 15° C. to about 25° C., with a catalyst prepared from (1) an alkyl metal compound of a metal belonging to the 2nd and 3rd groups, inclusive, of the Mendeleeff Periodic Table and in which compound the alkyl groups contain from 1 to 6 carbon atoms, and (2) a compound of a transition metal belonging to the 4th group of said Periodic Table in which the metal has the maximum valency corresponding to its position in the table and at least all but one of the valencies thereof are satisfied by halogen atoms, in a molar ratio between 1:1 and 2.5:1, by adding a solution of the alkyl metal compound in a solvent therefor selected from the group consisting of saturated aliphatic and cycloaliphatic hydrocarbon solvents to a solution of the transition metal compound in a solvent selected from said group, with stirring, thereby obtaining a crude polybutadiene comprising a fraction prevailingly consisting of polybutadiene having a 1,4-cis configuration, treating the crude polybutadiene with ethyl ether to dissolve the fraction prevailingly consisting of polybutadiene having 1,4-cis configuration, and separating a polybutadiene having substantially cis-1,4 configuration from an ether solution of said fraction by cooling the ether solution until precipitation occurs, redissolving the precipitate in ether at room temperature, and cooling the last-mentioned ether solution to effect reprecipitation of the polybutadiene having substantially 1,4-cis configuration.

2. The process according to claim 1, characterized in that the butadiene is polymerized in contact with a catalyst prepared from an aluminum trialkyl in which the alkyl groups contain from 1 to 6 carbon atoms and a halide of titanium in which the metal has the maximum valency corresponding to its position in the Periodic Table.

3. The process according to claim 1, characterized in that the butadiene is polymerized in contact with a 5% by weight hydrocarbon solvent solution of a catalyst prepared from an aluminum trialkyl in which the alkyl groups contain from 1 to 6 carbon atoms and a halide of titanium in which the metal has the maximum valency corresponding to its position in the Periodic Table, the aluminum to titanium molar ratio being between 1:1 and 2.5:1.

4. The process according to claim 1, characterized in that the butadiene is polymerized in contact with a catalyst prepared from triethyl aluminum and titanium tetrachloride, the aluminum to titanium molar ratio being between 1:1 and 1.5:1.

5. The process according to claim 1, characterized in that the crude polybutadiene is extracted successively with boiling acetone, methylethyl ketone and ethyl ether, and the polybutadiene having substantially cis-1,4 configuration is separated from the ether extract by repeated fractional crystallization by dissolving the extract in ether at room temperature, cooling the solution to a temperature below 0° C. until precipitation occurs, redissolving the precipitate in ether, and cooling the solution thus obtained to a temperature below 0° C. to effect reprecipitation of the polybutadiene having substantially cis-1,4 configuration.

6. The process according to claim 5, characterized in that a polymer fraction consisting essentially of polybutadiene having 1,4-cis configuration and which is insoluble in ether at low temperature and crystalline at room temperature is separated from the ether extract by redissolving said extract in ether, cooling the solution to a temperature between −30° C. and −70° C. until precipitation occurs, redissolving the precipitate in ether, and cooling the solution thus obtained to a temperature between −30° C. and −70° C. to effect re-precipitation of the polymer fraction consisting essentially of the polybutadiene having 1,4-cis configuration.

7. A process for producing a crystalline polybutadiene having substantially 1,4-cis configuration, which process comprises polymerizing butadiene at a temperature of from about 15° C. to about 25° C. and in contact with a catalyst prepared from an alkyl compound of a metal belonging to the 2nd and 3rd groups inclusive of the Mendeleeff Periodic Table and a compound of a transition metal belonging to the 4th group of said Periodic Table in which compound the metal has the maximum valency corresponding to its position in the Periodic Table and at least all but one of the valencies of the metal are satisfied by halogen atoms, in a molar ratio of from 1:1 to 2.5:1, by adding a solution of the alkyl metal compound in a solvent selected from the group consisting of saturated aliphatic and cyclo-aliphatic hydrocarbon solvents to a solution of the transition metal compound in a solvent selected from said group, with stirring, extracting the resulting crude polymerizate successively with boiling acetone, methylethyl ketone, and ether, and then extracting the ether extract at a temperature below 0° C. with a saturated aliphatic hydrocarbon solvent which is liquid at the extracting temperature until there is obtained a residue which is sulfur-vulcanizable and, after vulcanization, is crystalline at room temperature under stretching and consists essentially of polybutadiene having 1,4-cis configuration.

8. A process for producing crystalline polybutadiene having substantially 1,4-cis configuration, which process comprises polymerizing butadiene, at a temperature of from about 15° C. to about 25° C. and in contact with a catalyst prepared from an alkyl compound of a metal belonging to the 2nd and 3rd group inclusive of the Mendeleeff Periodic Table and a compound of a transition metal belonging to the 4th group of said Table in which compound the metal has the maximum valency corresponding to its position in the Periodic Table and at least all but one of the valencies of the metal are satisfied by halogen atoms, in a molar ratio of from 1:1 to 2.5:1, by adding a hydrocarbon solvent solution of the alkyl metal compound to a hydrocarbon solvent solution of the transition metal compound, with stirring, to thereby obtain a crude polymerizate, extracting the crude polymerizate successively with boiling acetone, methylethyl ketone, and ether, and then extracting the ether extract with a solvent selected from the group consisting of propane, butane and pentane and at a temperature between $-30°$ C. and $-50°$ C. until there is obtained a residue which is sulfur-vulcanizable and, after vulcanization is crystalline at room temperature under stretching and consists essentially of polybutadiene having 1,4-cis configuration.

References Cited by the Examiner

UNITED STATES PATENTS

| | | | |
|---|---|---|---|
| 2,699,457 | 1/1955 | Ziegler et al. | 260—94.9 |
| 2,797,208 | 6/1957 | Burke | 260—94.2 |
| 2,832,759 | 4/1958 | Nowlin et al. | 260—94.2 |
| 2,882,264 | 4/1958 | Barnes et al. | 260—94.3 |
| 3,178,402 | 4/1965 | Smith et al. | 260—94.3 |

FOREIGN PATENTS

| | | |
|---|---|---|
| 538,782 | 12/1955 | Belgium. |
| 543,292 | 6/1956 | Belgium. |
| 611,157 | 10/1948 | Great Britain. |

OTHER REFERENCES

Williams: Physics, vol. 7, No. 11, November 1936, pp. 399, 402.

Hanson et al.: J.A.C.S., vol. 70, February 1948, pp. 779–83.

Hampton: Analyt. Chem., vol. 21, No. 8, August 1949, pp. 923–26.

Meyer et al.: Rubber Chem. & Tech., vol. 26, No. 3, July 1953, pp. 522–27.

Medalia et al.: J.A.C.S., vol. 75, 1953, pp. 4790–93.

Binder: Ind. & Eng. Chem., vol. 46, No. 8, August 1954, pp. 1727–30.

JOSEPH L. SCHOFER, *Primary Examiner.*

BEN E. LANHAN, WILLIAM H. SHORT, DANIEL ARNOLD, LESLIE H. GASTON, MORRIS LIEBMAN, *Examiners.*

E. J. SMITH, R. E. WEXLER, S. ASTOR, J. M. TEPLITZ, G. E. REED, M. JACOBS, *Assistant Examiners.*